United States Patent [19]
Shields

[11] Patent Number: 5,881,557
[45] Date of Patent: Mar. 16, 1999

[54] VACUUM SYSTEM FOR DIESELS AND HIGH PERFORMANCE VEHICLES

[76] Inventor: David A. Shields, 316 Cora St., Center, Tex. 75935

[21] Appl. No.: 876,719

[22] Filed: Jun. 16, 1997

[51] Int. Cl.$^6$ .................................................... B60T 17/18
[52] U.S. Cl. ................................................ 60/405; 60/397
[58] Field of Search .............................. 60/405, 397, 412

[56] References Cited

U.S. PATENT DOCUMENTS

| | | | |
|---|---|---|---|
| 2,427,347 | 9/1947 | Bessy | 60/405 |
| 2,910,327 | 10/1959 | Blair | 60/397 |
| 3,094,843 | 6/1963 | Martin | 60/397 |
| 3,734,226 | 5/1973 | MacDuff | 60/403 |
| 3,901,342 | 8/1975 | Nunn, Jr. | 60/405 |

*Primary Examiner*—Sheldon J. Richter
*Attorney, Agent, or Firm*—John M. Harrison

[57] ABSTRACT

A vacuum back-up system for diesel vehicles, and a primary vacuum system for high performance vehicles, which vacuum system includes a vacuum pump for creating a vacuum in an associated reserve vacuum tank connected to the vacuum booster of the vehicle. A relay is attached to the vacuum pump or to a mount bracket which mounts the vacuum pump and the reserve vacuum tank and the relay is electrically connected to a vacuum switch on the vacuum booster and to the vehicle battery and the vacuum pump to facilitate operation of the vacuum pump and maintaining a vacuum of preselected magnitude in the reserve vacuum tank and the vacuum booster.

12 Claims, 2 Drawing Sheets

VACUUM SYSTEM FOR DIESELS AND HIGH PERFORMANCE VEHICLES

BACKGROUND OF THE INVENTION

Field of the Invention

This invention relates to braking systems for diesel and high performance vehicles and more particularly, to a vacuum back-up system for vacuum boosters in diesel vehicles and a primary vacuum system for high performance vehicles, such as racing cars. The vacuum system is designed to maintain a vacuum of preselected magnitude in the conventional vacuum booster of a diesel vehicle and as a primary vacuum system in the high performance vehicles, under circumstances where the primary vehicle vacuum pump or vacuum system fails in a diesel vehicle and vacuum is lost or reduced in the vacuum booster of either a diesel or a high performance vehicle. Accordingly, the back-up braking system of this invention monitors and prevents undesirable loss of vacuum in the conventional vacuum booster of a vehicle and thus preserves the integrity of the vehicle brake system under circumstances where the vehicle vacuum pump or engine vacuum system which normally creates a vacuum in the vacuum booster, fails to operate properly or generate a satisfactory brake-operating vacuum. In a high performance vehicle, the system provides vacuum for a vacuum-operated brake system.

One of the problems which exists in the braking systems of diesel vehicles and particularly diesel trucks, is that of failure of the braking system under circumstances where the primary vehicle vacuum pump or vacuum system malfunctions, thereby causing vacuum failure in the vacuum booster of the vehicle. Such failure can have serious consequences in operating the vehicle, since the vacuum-operated brakes might fade or fail under such circumstances. In a conventional diesel vehicle braking system the vacuum booster is mounted under the hood, on the firewall of the vehicle and is fitted with a check valve to avoid loss of vacuum. Further included is a vacuum booster line that connects to a vehicle vacuum pump for maintaining a vacuum of selected magnitude in the vacuum booster when the vehicle is operated. Occasionally, malfunction of this primary vehicle vacuum pump or other element in the vacuum system causes loss of vacuum in the vacuum booster and corresponding fading or failure of the vehicle brake system. In high performance vehicles such as racing cars, a problem exists in maintaining adequate vacuum from the engine to the brake booster in vacuum-operated brake systems.

Accordingly, it is an object of this invention to provide a new and improved vacuum back-up system for diesel vehicles and a primary vacuum system for high performance vehicles, which system is designed to maintain a vacuum in the vacuum booster of a vehicle by means of an auxiliary vacuum pump and reserve vacuum tank combination.

Another object of this invention is to provide a vacuum back-up system for diesel vehicles and diesel trucks in particular, which vacuum back-up system is characterized by an auxiliary vacuum pump connected to a reserve vacuum tank for inducing and maintaining a vacuum in the reserve vacuum tank, which reserve vacuum tank is, in turn, connected to the conventional vehicle vacuum booster by means of a check valve to facilitate maintenance of a suitable operating vacuum in the vacuum booster under circumstances where the primary vehicle pump fails to maintain the operating vacuum in the vacuum booster.

Yet another object of this invention is to provide a vacuum system for vehicles, including high performance vehicles, which system is characterized by a vacuum pump and a reserve vacuum tank mounted on a common bracket for disposition beneath the hood of the vehicle. The reserve vacuum tank is connected to the vacuum booster of the vehicle by means of a check valve and vacuum line and to the vacuum pump by means of a second vacuum line, such that operation of the vacuum pump by means of a relay and vacuum switch mounted on the vacuum booster maintains a vacuum in the reserve vacuum tank and the same vacuum in the vacuum booster, under circumstances where the primary vehicle vacuum pump or engine vacuum system fails to maintain an acceptable brake-operating vacuum in the vacuum booster.

A still further object of this invention is to provide a vacuum backup system for vehicles and diesel trucks and high performance vehicles in particular, which system includes a reserve vacuum tank connected by means of a vacuum line to a reserve vacuum pump, which reserve vacuum tank is, in turn, connected by means of a check valve and vacuum line to the vacuum booster of the vehicle. A relay is electrically connected to the vehicle battery, the vacuum pump and to a vacuum switch that monitors the vacuum in the vacuum booster. The vacuum switch thus serves to initiate operation of the reserve vacuum pump under circumstances where the vacuum in the vacuum booster falls below an acceptable brake-operating level.

SUMMARY OF THE INVENTION

These and other objects of the invention are provided in a new and improved vacuum back-up system for diesel vehicles and high performance vehicle applications, which system includes a reserve vacuum pump and a reserve vacuum tank mounted on a common bracket for insertion under the hood of the vehicle, the reserve vacuum tank being connected to the reserve vacuum pump by means of a vacuum line. The reserve vacuum tank is also connected to the vacuum booster of the vehicle by means of a second vacuum line and a relay is electrically connected to the vehicle battery and to the vacuum pump and incorporates a vacuum switch mounted on the vacuum booster, which vacuum switch operates to initiate operation of the reserve vacuum pump under circumstances where the primary vehicle vacuum pump or engine vacuum system if any, fails and the vacuum in the vacuum booster falls below a predetermined brake-operating level. The reserve vacuum in the reserve vacuum tank thus communicates with the vacuum in the vacuum booster and the vacuum level in the vacuum booster is automatically maintained at the predetermined level in the reserve vacuum tank, to preserve operation of the vehicle braking system.

BRIEF DESCRIPTION OF THE DRAWING

The invention will be better understood by reference to the accompanying drawing, wherein.

DESCRIPTION OF THE PREFERRED EMBODIMENTS

Figure 1:
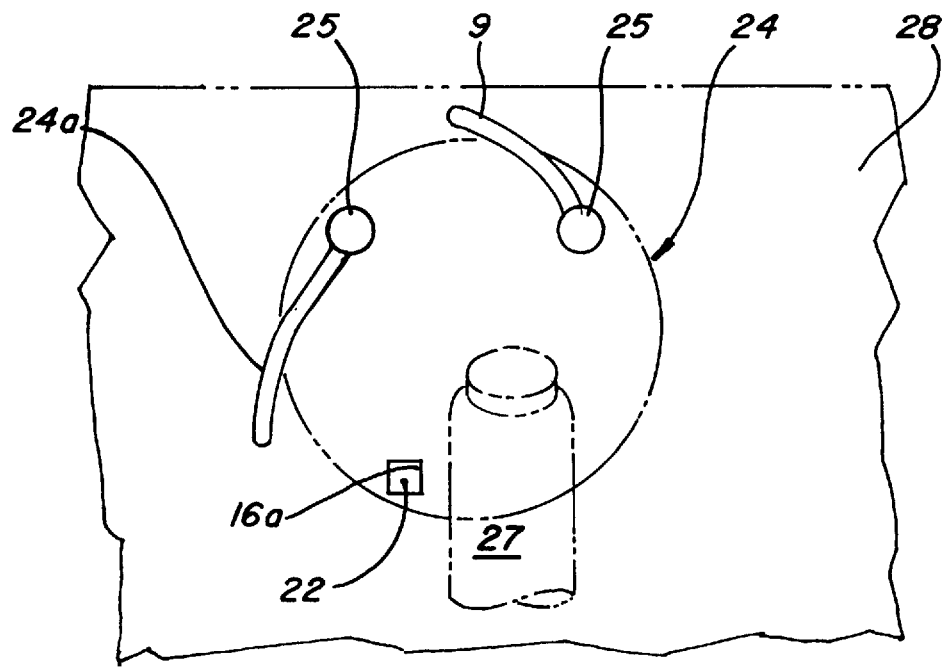
FIG. 1 is a front view of a conventional vacuum booster mounted under the hood and on the firewall of a diesel vehicle, more particularly illustrating connection of the reserve vacuum tank of the vacuum back-up system of this invention, along with a conventional vacuum pump, to the vacuum booster by means of vacuum lines and check valves.

Referring initially to FIG. 1 of the drawing, a segment of the firewall 28 of a vehicle (not illustrated) in which the vacuum back-up system or primary vacuum system 1 of this invention is mounted, is illustrated and a vacuum booster 24 is mounted on the firewall 28 in conventional fashion. A check valve 25 is connected to one end of a vacuum booster line 24a, which terminates, in the case of a conventional diesel engine, at a conventional primary vehicle vacuum booster pump (not illustrated), wherein the vacuum in the vehicle vacuum booster 24 is normally maintained at a preselected level. Accordingly, the conventional vacuum booster 24 and vacuum booster pump in the diesel vehicle, are designed to maintain a vacuum of suitable operating magnitude in the vacuum booster 24 while the vehicle is operating, in order to maintain the vacuum-operated brake system in proper order. A power steering reservoir 27 is illustrated in phantom in FIG. 1 to indicate the relative position of the vacuum booster 24 under the hood of the vehicle on the firewall 28. When the vacuum back-up system or primary vacuum system 1 of this invention is installed, whether in a diesel-operated vehicle or in a high performance vehicle, a check valve 25 is mounted on the vacuum booster 24 and is connected to a vacuum booster line 9, which connects to the operating elements of the vacuum back-up system 1, as hereinafter described. A vacuum switch 16a is also mounted on the vacuum booster 24 to monitor the vacuum inside the vacuum booster 24, for purposes which will be hereinafter described.

Figure 2:
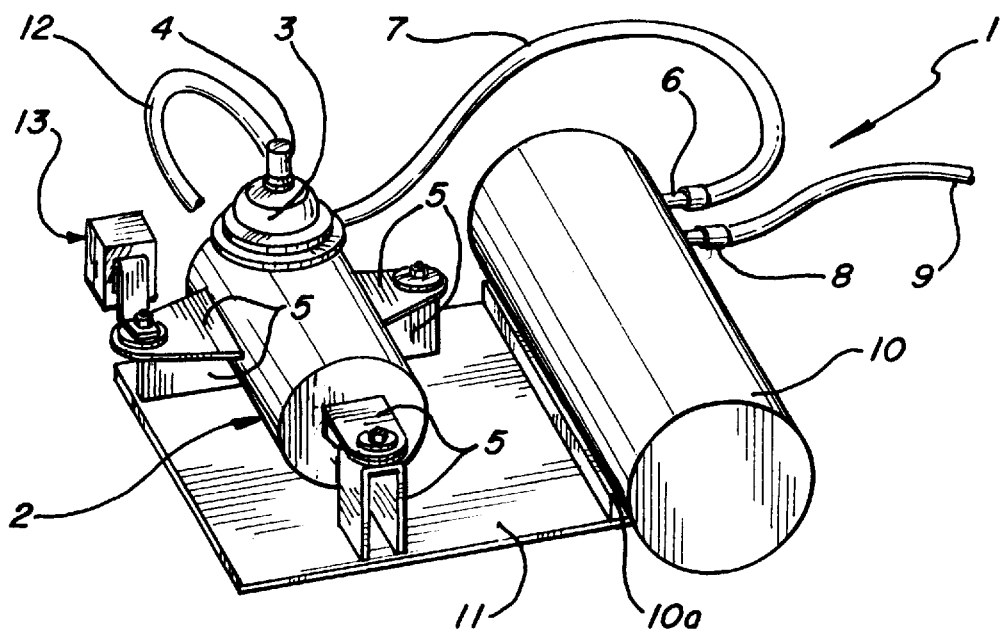
FIG. 2 is a perspective view of a preferred embodiment of the vacuum back-up system of this invention for installation under the hood of a diesel vehicle.

Referring now to FIGS. 1 and 2 of the drawing, the vacuum booster line 9 connects the second check valve 25 to a vacuum booster nipple 8, which is seated in a reserve vacuum tank 10, mounted on a mount bracket 11 by means of a tank bracket 10a, as illustrated in FIG. 2. The reserve vacuum tank 10 is also connected at a vacuum tank nipple 6 by means of a vacuum tank line 7 to the diaphragm 3 of a vacuum pump 2, which vacuum pump 2 is likewise mounted by means of pump brackets 5 on the mount bracket 11 with the reserve vacuum tank 10. A diaphragm nipple 4 extends from the diaphragm 3 and receives a length of protective tubing 12, as further illustrated in FIG. 2, to serve as an air exhaust line. A relay 13 is mounted on one of two pump brackets 5 that extend from the vacuum pump 2 and secure the vacuum pump 2 to the mount bracket 11.

Figure 3:
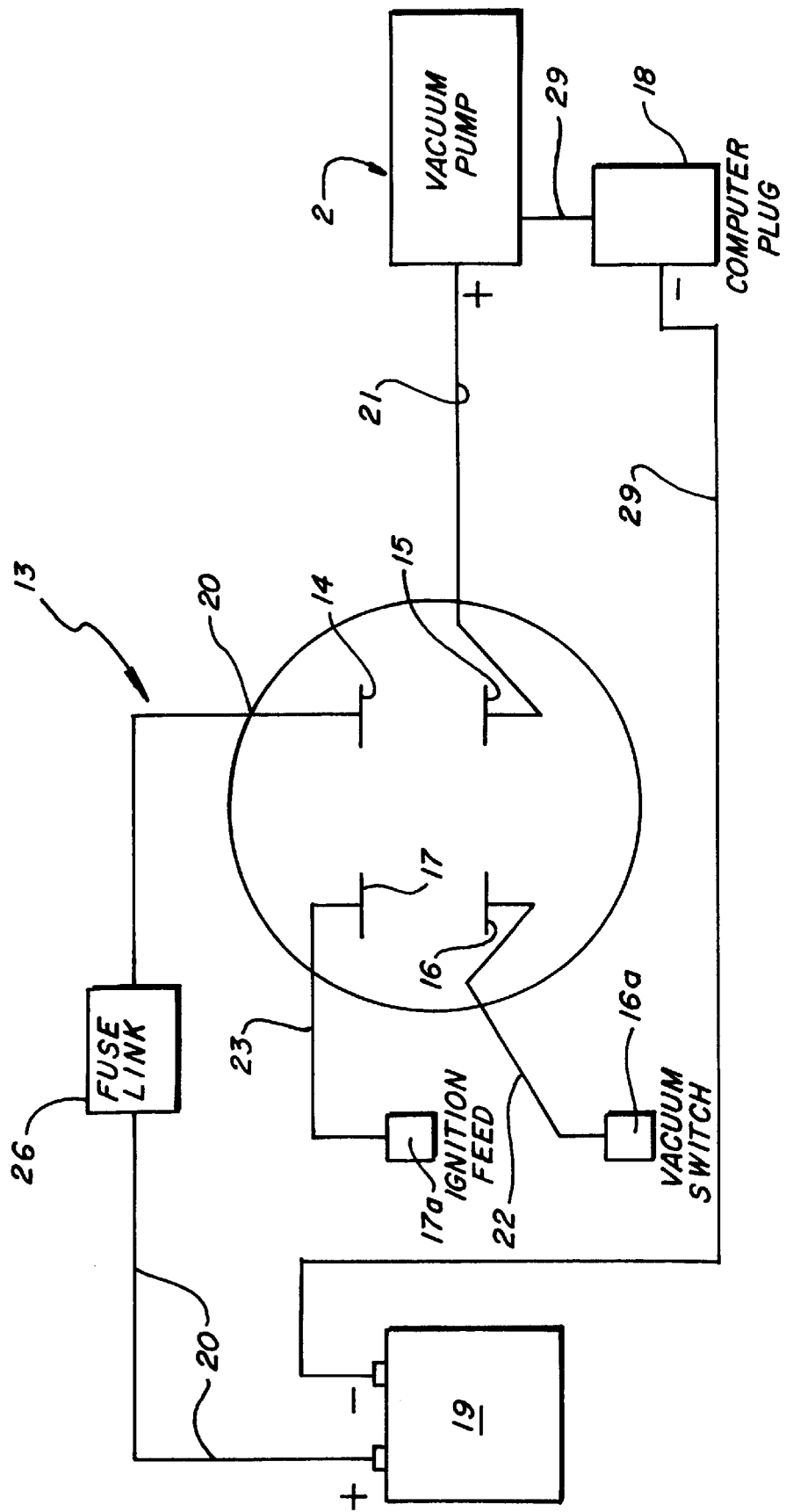
FIG. 3 is a schematic diagram of a typical relay and associated operating elements for effecting selective operation of the vacuum pump element of the vacuum back-up system of this invention under circumstances where the vacuum in the vacuum booster illustrated in FIG. 1 falls below a predetermined operating level.

Referring now to FIG. 3 of the drawing, in a preferred embodiment of the invention the relay 13 is characterized by a battery contact 14, a vacuum pump contact 15, a vacuum switch contact 16 and an ignition feed contact 17. The battery contact 14 is connected to the positive terminal of the battery 19 by means of battery wiring 20 and the vacuum pump contact 15 is connected to the vacuum pump 2 by means of vacuum pump wiring 21. Similarly, the vacuum switch contact 16 is connected to the vacuum switch 16a, typically mounted on the vacuum booster 24, as illustrated in FIG. 1, by means of vacuum switch wiring 22, while the ignition feed contact 17 is connected to an ignition feed 17a by means of ignition feed wiring 23, as further illustrated in FIG. 3. A fuse link 26 is provided in the battery wiring 20 for safety purposes in case of a circuit overload and the conventional computer plug 18 in the diesel vehicle is connected to the vacuum pump 2 for convenience by means of computer plug wiring 29. The negative terminal of the battery 19 is further conventionally connected to the computer plug 18 by means of additional computer plug wiring 29.

In operation, it will be appreciated from a consideration of FIGS. 1–3 of the drawing that the vacuum back-up system or primary vacuum system 1 of this invention is attached to the vehicle vacuum booster 24 by means of the vacuum booster line 9 and corresponding check valve 25, to facilitate maintaining a vacuum in the vacuum booster 24 in the event of failure of the conventional vacuum pump or vacuum system (not illustrated), in the case of diesel engines, or low engine vacuum which is characteristic of engines in high performance vehicles. Accordingly, under circumstances where the vacuum in the vacuum booster 24 falls below a preselected level by malfunction of the conventional primary vacuum pump or associated vacuum-inducing equipment in the diesel engine or in a high performance application, the vacuum switch 16a senses this vacuum deficiency and electrically energizes the relay 13, which is energized for response by the ignition feed 17a and is connected to the battery 19 by means of the battery wiring 20 and the computer plug wiring 29. The battery contact 14, vacuum pump contact 15, vacuum switch contact 16, and ignition feed contact 17 then operate in the relay 15 as hereinafter described, to energize the vacuum pump 2, which maintains a vacuum in the reserve vacuum tank 10 through the vacuum tank line 7, as illustrated in FIG. 2. This action, in turn, further boosts the vacuum in the vacuum booster 24, which is connected to the reserve vacuum tank 10 by means of the vacuum booster line 9. Accordingly, when the vacuum in the vacuum booster 24 reaches a preselected level, the vacuum pump 2 is de-energized by automatic operation of the vacuum switch 16a and the vacuum pump 2 does not operate again unless the vacuum in the vacuum booster 24 again falls below the predetermined operating level, wherein the procedure is repeated. Specifically, and referring again to FIG. 3 of the drawing, when the ignition switch (not illustrated) in the vehicle is operated, the ignition feed 17a creates a magnetic field in the relay 13 by operation of the vacuum switch contact 16 and the ignition feed contact 17. If the vacuum in the vacuum booster 24 is low, the vacuum switch 16a senses this condition and causes the battery contact 14 and the vacuum pump contact 15 to close, thus energizing the vacuum pump 2. When the vacuum level in the vacuum booster 24 is lowered to a predetermined operating level by operation of the vacuum pump 2, the vacuum switch 16a senses this condition and causes the relay 13 to operate and cause the vacuum pump contact 15 and vacuum switch 16 to separate and terminate operation of the vacuum pump 2.

It will be appreciated by those skilled in the art that the vacuum system 1 of this invention can be installed in substantially any diesel vehicle, including diesel automobiles and trucks, and high performance vehicles such as racing cars, under circumstances where it is desired to back up the braking system or provide a primary vacuum system and insure that the braking system will not fail upon failure of the conventional primary vacuum pump or low engine vacuum. The vacuum back-up system 1 is compact, easily installed, being typically wired to the computer plug 18 for convenience and is easily operated.

While the preferred embodiments of this invention have been described above, it will be recognized and understood that various modifications may be made in the invention and the appended claims are intended to cover all such modifications which may fall within the spirit and scope of the invention.

Having described my invention with the particularity set forth above, what is claimed is:

1. A vacuum back-up system for maintaining an operating vacuum in a vacuum booster, comprising an auxiliary vacuum pump and a vacuum tank connected to said auxiliary vacuum pump and the vacuum booster, whereby said auxiliary vacuum pump produces an operating vacuum in said vacuum tank and maintains the operating vacuum in the vacuum booster responsive to a reduction of the operating vacuum in the vacuum booster.

2. The vacuum back-up system of claim 1 comprising a mount bracket for receiving and mounting said auxiliary vacuum pump andsaid vacuum tank in close proximity to each other.

3. The vacuum back-up system of claim 1 comprising:
   (a) control means provided provided in vacuum-sensing relationship with respect to the vacuum booster, said control means electrically connected to said auxiliary vacuum pump for sensing a reduction of operating vacuum in the vacuum booster and activating said auxiliary vacuum pump; and
   (b) a mount bracket for receiving and mounting said auxiliary vacuum pump and said vacuum tank in close proximity to each other.

4. The vacuum back-up system of claim 1 comprising control means provided in vacuum-sensing relationship with respect to the vacuum booster, said control means electrically connected to said auxiliary vacuum pump for sensing a reduction of operating vacuum in the vacuum booster and activating said auxiliary vacuum pump.

5. The vacuum back-up system of claim 2 wherein said control means comprises a relay electrically connected to said auxiliary vacuum pump for operating said auxiliary vacuum pump, an ignition feed electrically connected to said relay for energizing said relay and a vacuum switch provided in said vacuum-sensing relationship with respect to the vacuum booster, said vacuum switch electrically connected to said relay, whereby said auxiliary vacuum pump is operated responsive to operation of said ignition feed and said vacuum switch when said vacuum switch senses a reduction in the operating vacuum in the vacuum booster.

6. The vacuum back-up system of claim 5 comprising a mount bracket for receiving and mounting said auxiliary vacuum pump and said vacuum tank in close proximity to each other.

7. A vacuum back-up system for maintaining a selected operating vacuum in the vacuum booster of a vehicle, said vacuum back-up system comprising an auxiliary vacuum pump, a vacuum tank connected to said auxiliary vacuum pump and the vacuum booster for inducing a vacuum in said vacuum tank and the vacuum booster responsive to operation of said auxiliary vacuum pump and control means provided in vacuum-sensing relationship with respect to the vacuum booster, said control means electrically connected to said auxiliary vacuum pump for sensing the reduction of operating vacuum in the vacuum booster and activating said auxiliary vacuum pump.

8. The vacuum back-up system of claim 7 comprising a mount bracket for receiving and mounting said auxiliary vacuum pump and said vacuum tank in close proximity to each other.

9. The vacuum back-up system of claim 7 wherein said control means comprises a relay electrically connected to said auxiliary vacuum pump for operating said auxiliary vacuum pump, an ignition feed electrically connected to said relay for energizing said relay and a vacuum switch provided in said vacuum-sensing relationship with respect to the vacuum booster, said vacuum switch electrically connected to said relay, whereby said auxiliary vacuum pump is operated responsive to operation of said ignition feed and said vacuum switch when said vacuum switch senses a reduction in the operating vacuum in the vacuum booster.

10. The vacuum back-up system of claim 9 comprising a mount bracket for receiving and mounting said auxiliary vacuum pump and said vacuum tank in close proximity to each other.

11. A vacuum back-up system for maintaining an operating vacuum in the vacuum booster of a vehicle, said vacuum back-up system comprising an auxiliary vacuum pump, a vacuum tank connected to said auxiliary vacuum pump and the vacuum booster for inducing a vacuum in said vacuum tank and the vacuum booster responsive to operation of said auxiliary vacuum pump and a relay electrically connected to said auxiliary vacuum pump for operating said auxiliary vacuum pump, an ignition feed electrically connected to said relay for energizing said relay and a vacuum switch provided in said vacuum-sensing relationship with respect to the vacuum booster, said vacuum switch electrically connected to said relay, whereby said auxiliary vacuum pump is operated responsive to operation of said ignition feed and said vacuum switch when said vacuum switch senses a reduction in the operating vacuum in the vacuum booster.

12. The vacuum back-up system of claim 11 comprising a mount bracket for receiving and mounting said auxiliary vacuum pump and said vacuum tank in close proximity to each other.

* * * * *